April 24, 1934.   A. GENTET   1,956,384
POCKET CRYPTOGRAPHIC APPARATUS
Filed Dec. 1, 1931   2 Sheets-Sheet 1
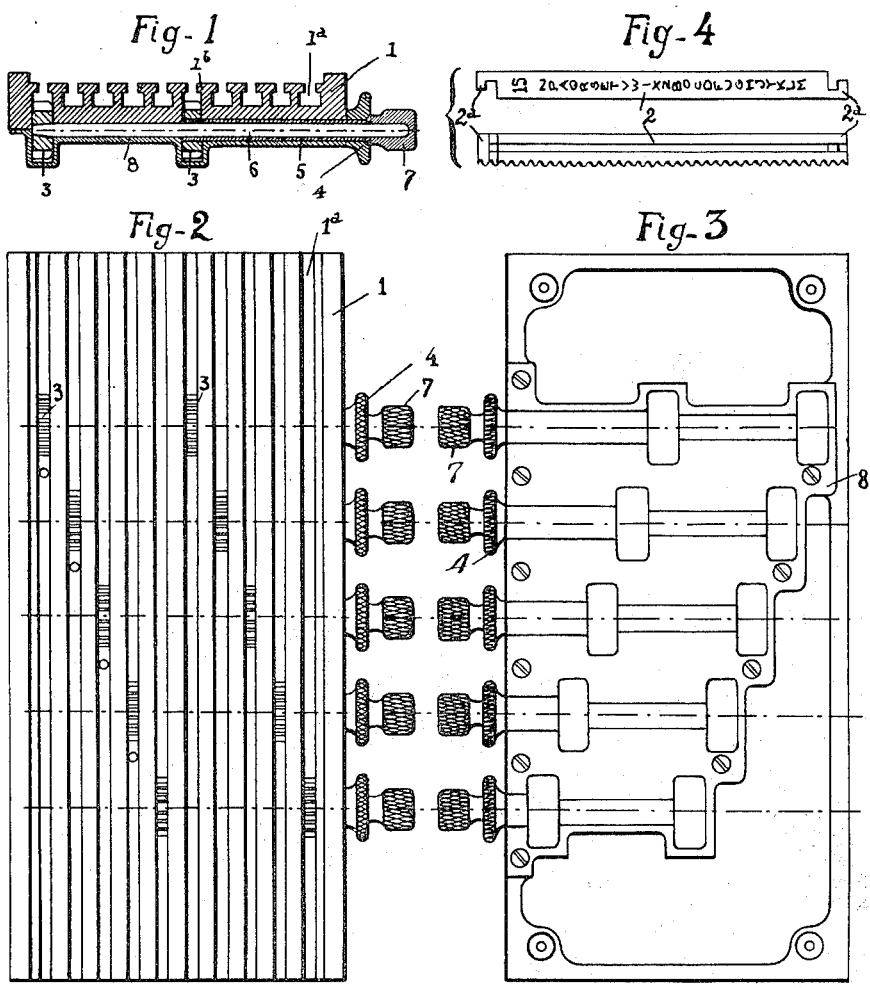
Inventor:
Albert Gentet April 24, 1934.  A. GENTET  1,956,384
POCKET CRYPTOGRAPHIC APPARATUS
Filed Dec. 1, 1931  2 Sheets-Sheet 2

Inventor:
Albert Gentet,
By ...
att.

Patented Apr. 24, 1934

1,956,384

UNITED STATES PATENT OFFICE 1,956,384

POCKET CRYPTOGRAPHIC APPARATUS

Albert Gentet, Paris, France

Application December 1, 1931, Serial No. 578,278
In France February 4, 1931

1 Claim. (Cl. 35—13)

My invention relates to improvements in pocket cryptographic apparatus with permutable slides.

The improved apparatus essentially comprises a suitable number of rack-like slides, all of which are interchangeable and each of which carries a numeral and the letters composing the alphabet, the inscribed numerals being all different and the letters constituting the several alphabets being all disposed differently the one with respect to the others on the various slides.

These slides, which can be coupled together in pairs by their extremities, may be caused to slide in grooves formed in a base member, by means of toothed pinions controlled by suitable spindles, in such a manner that for each of the groups of two coupled slides all the letters carried by these slides can simultaneously and respectively pass in front of two reference marks which are provided on the base member perpendicularly to said slides in such a manner that a letter of the one corresponds to the letter on the same row of the other.

The accompanying drawings show by way of example only, one embodiment of the invention.

Fig. 1 is a diagrammatic transverse section of the base member,

Fig. 2 is a top plan view thereof,

Fig. 3 is a bottom plan view thereof,

Fig. 4 shows a slide both in plan view and side elevation,

Figure 5:
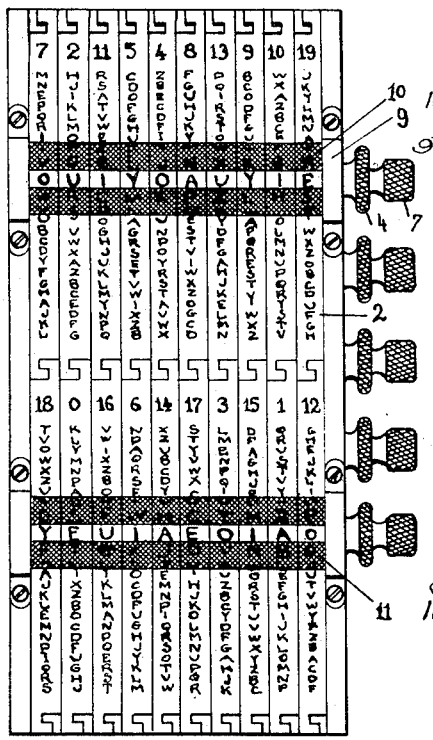
Fig. 5 is a top plan view of the complete apparatus.
Figure 6:
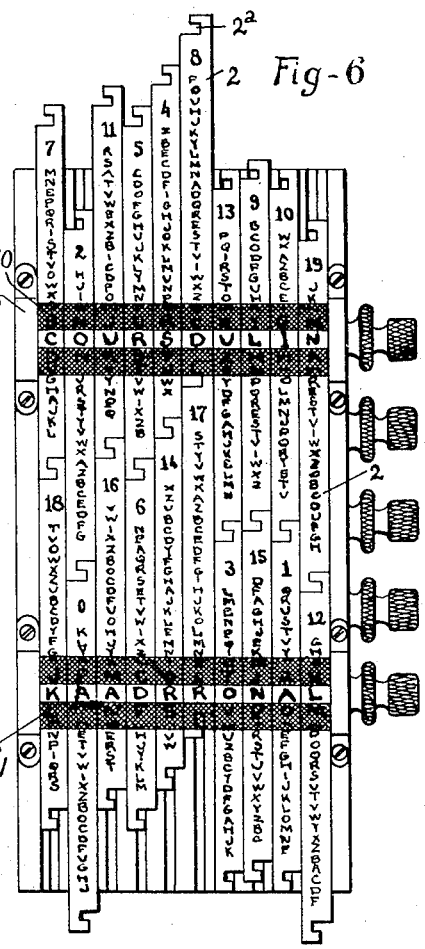
Fig. 6 is a top plan view of the apparatus illustrating the making of a cryptogram.

On the drawings 1 is the grooved base member having in the embodiment shown ten parallel grooves $1^a$ (Fig. 1) in which the twenty rack slides 2, assembled in pairs by means of their ends $2^a$, are free to slide, (Figs. 5 and 6).

$1^b$ indicates slots formed in the bottom of each groove to accommodate pinions 3 meshing with the rack teeth of the slides 2. At 4 are indicated operating knobs for tubular spindles 5 controlling five of the pinions 3, the other five thereof being controlled by solid spindles 6 passing through the tubular spindles 5 and provided with knobs 7 which are coaxial with the knobs 4 (Fig. 1).

8 is a protective casing maintaining the spindles and pinions in place (Fig. 3).

At 9 are indicated members which serve for the mounting on the base member 1, perpendicularly to the grooves $1^a$, of two reference marks 10 and 11 constituted by two lenses extending across the slides and being transparent over a narrow and well defined zone in their central portion, the marginal portions being either depolished or roughened or otherwise obscured, as by colouring.

The operation of this apparatus will be readily understood.

First, the twenty slides 2 coupled together in pairs are pushed into the ten grooves $1^a$ of the base member 1 (Fig. 5) in such a manner that the order numerals of the head slides and of the tail slides form the sequence of numbers which has previously been agreed upon between the correspondents.

The cryptogram is then produced in the following manner:

Assuming that the text "Cours du lin" (Fig. 6) is to be ciphered, the knurled knobs 4 and 7 are operated in such a manner that in the central part of the reference mark 10, provided for the head slides, there appear successively the letters C, for the first slide from the left, O for the second and so on to the letter N for the last slide.

By reason of the above mentioned coupling, the tail slides have also been displaced during the preceding operation and the cryptogram has appeared in the central part of their reference mark 11, in this case "Kaadrronal" (Fig. 6). Any other cryptograms for the same text could be obtained by modifying the permutation of the slides. The number of different cryptograms which could thus be obtained is equal to the number of simple permutations of twenty numerals, namely:

2,432,902,008,176,640,000.

The cryptogram can be deciphered by preparing the apparatus as for ciphering, i. e. by producing the same permutation of the slides, and then causing the successive letters of the cryptogram to appear in the reference mark 11 of the tail slides.

The deciphered text will then appear in the reference mark 10 of the head slides.

It will be understood that various modifications may be made in the apparatus without a departure from the scope of this invention. For example, the number of slides employed may be varied and the control knobs with the spindles of the pinions may be otherwise disposed or replaced by other suitable operating gear.

I claim:

For use in cryptographic devices exchangeable symbol carrying slides having oppositely directed hooks at opposite ends whereby to permit the slides to be quickly coupled and uncoupled for making up inter-changeable sets, and a grooved base part for receiving said slides.

ALBERT GENTET.